(12) United States Patent
Kakumoto et al.

(10) Patent No.: US 11,374,423 B2
(45) Date of Patent: **\*Jun. 28, 2022**

(54) BATTERY CHARGER PERFORMING ZERO-CROSSING CONTROL

(71) Applicants: SHINDENGEN ELECTRIC MANUFACTURING CO., LTD., Tokyo (JP); HONDA MOTOR CO., LTD., Tokyo (JP)

(72) Inventors: Shigeki Kakumoto, Hanno (JP); Atsuyuki Kobayashi, Wako (JP)

(73) Assignees: SHINDENGEN ELECTRIC MANUFACTURING CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 16/827,740

(22) Filed: Mar. 24, 2020

(65) Prior Publication Data

US 2020/0328610 A1 Oct. 15, 2020

(30) Foreign Application Priority Data

Apr. 12, 2019 (JP) .............................. JP2019-076192

(51) Int. Cl.
*H02J 7/00* (2006.01)
*H02M 3/337* (2006.01)
*H02J 9/06* (2006.01)

(52) U.S. Cl.
CPC ...... *H02J 7/007182* (2020.01); *H02J 7/0068* (2013.01); *H02J 9/062* (2013.01); *H02M 3/3376* (2013.01); *H02J 2207/40* (2020.01)

(58) Field of Classification Search
CPC .................................................. H02J 7/1461
(Continued)

(56) References Cited

U.S. PATENT DOCUMENTS 5,969,507 A * 10/1999 Meyer ................... H02J 7/0069
320/137
8,466,653 B2 * 6/2013 Tabuta .................. H02J 7/1492
320/107
(Continued)

FOREIGN PATENT DOCUMENTS

DE  19882461    5/2012
WO  98/54827    12/1998
WO  2010-073593  7/2010

OTHER PUBLICATIONS

German Office Action for German Patent Application No. 102020203484.2 dated Oct. 12, 2021.
(Continued)

*Primary Examiner* — Yalkew Fantu
(74) *Attorney, Agent, or Firm* — Amin, Turocy & Watson, LLP

(57) ABSTRACT

A battery charger includes a plurality of rectifier, a plurality of switches respectively for the plurality of rectifier elements, a zero-crossing detector, a switch controller, and a detection reference changer. The plurality of rectifier elements rectify AC voltages of three phases output from a power generator. The plurality of rectifier elements, in an off-state, causes the plurality of rectifier elements to rectify the AC voltages to charge a battery. The plurality of rectifier elements, in an on-state, causes the AC voltages to be short-circuited to a negative side of the battery. The zero-crossing detector detects zero-crossings of the AC voltages. The switch controller outputs, based on the zero crossings, a gate signal for turning on and off the plurality of switches. The detection reference changer changes a reference for the zero-crossing detector to detect the zero crossings.

9 Claims, 8 Drawing Sheets

(58) Field of Classification Search
USPC .......................................................... 320/107
See application file for complete search history.

(56) References Cited

U.S. PATENT DOCUMENTS

2011/0241610 A1* 10/2011 Watanabe ................. H02J 7/14
320/108
2013/0249469 A1* 9/2013 Pahlevaninezhad .... H02M 1/10
320/107
2018/0294674 A1* 10/2018 Choi ................. H02M 3/33507
2018/0316225 A1* 11/2018 Yeo ......................... H02J 50/20

OTHER PUBLICATIONS

Jia, et al. "A Novel Monolithic Self-Synchronized Rectifier," 2008 Twenty-Third Annual IEEE Applied Power Electronics Conference and Exposition, 2008, pp. 907-912.

* cited by examiner

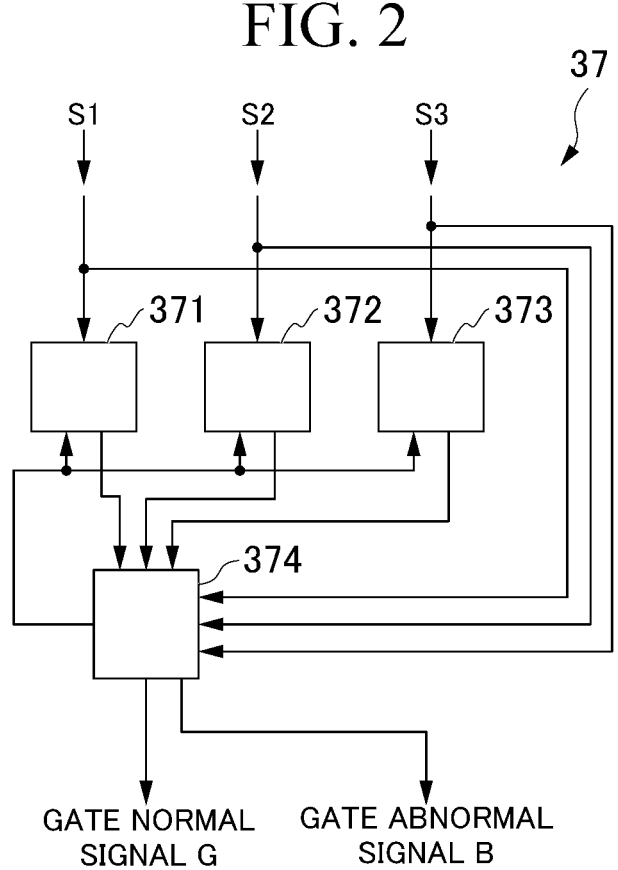

BATTERY CHARGER PERFORMING ZERO-CROSSING CONTROL

BACKGROUND

Field of the Invention

The present invention relates to a battery charger.

Priority is claimed on Japanese Patent Application No. 2019-076192, filed Apr. 12, 2019, the content of which is incorporated herein by reference.

Description of the Related Art

Conventional battery chargers for motorcycles use a permanent magnet three-phase alternating current generator (ACG) and an FET (Field Effect Transistor) short-circuit regulator that rectifies outputs of the ACG. In a FET short-circuit regulator, a zero-crossing control is generally used to reduce heat generation. In the zero-crossing control, a zero-crossing which becomes 0A (ampere) when a negative current flows is detected to perform switching.

In such a battery charger, if there is a load imbalance among the phases of the ACG, AC outputs of the ACG rises and swings only in a positive voltage region in some cases, so that a zero-crossing cannot be detected, thereby making it difficult to perform the zero-crossing control. As a countermeasure, in Republication No. WO 2010/073593 (hereinafter, Patent Document 1), switching is controlled synchronously in units of the three phases, thereby suppressing occurrence of a load imbalance among the three phases.

However, according to the conventional technology described in Patent Document 1, in a case where a battery voltage is high and a sudden load change occurs, such as in a racing motorcycle, the occurrence of the load imbalance among the phases cannot be sufficiently suppressed in some cases, thereby making it difficult to perform the zero-crossing control.

The present invention has been made to solve the above problem, and an object thereof is to provide a battery charger capable of performing zero-crossing control even when a sudden load change occurs.

SUMMARY

A battery charger according to one embodiment includes a plurality of rectifier, a plurality of switches respectively for the plurality of rectifier elements, a zero-crossing detector, a switch controller, and a detection reference changer. The plurality of rectifier elements are configured to rectify AC voltages of three phases output from a power generator. The plurality of rectifier elements are configured to, in an off-state, cause the plurality of rectifier elements to rectify the AC voltages to charge a battery. The plurality of rectifier elements are configured to, in an on-state, cause the AC voltages to be short-circuited to a negative side of the battery. The zero-crossing detector is configured to detect zero-crossings of the AC voltages. The switch controller is configured to output, based on the zero crossings, a gate signal for turning on and off the plurality of switches. The detection reference changer is configured to change a reference for the zero-crossing detector to detect the zero crossings.

In the battery charger according to another embodiment, the zero-crossing detector may be configured to compare each of the AC voltages with a reference voltage to detect the zero-crossings. The detection reference changer may include a reference voltage changer configured to change the reference voltage to change the reference.

In the battery charger according to another embodiment, the detection reference changer may include a voltage generator configured to generate an offset voltage that is a predetermined negative voltage. The detection reference changer may be configured to change the reference by supplying the offset voltage via a plurality of resistors respectively to a plurality of detection nodes where the zero-crossing detector detects the zero-crossings.

In the battery charger according to another embodiment, the detection reference changer may be configured to change the reference according to a load change of a load connected to the battery.

In the battery charger according to another embodiment, the detection reference changer may be configured to change the reference according to a load change of a load connected to the battery.

According to the embodiments, in the battery charger, the detection reference changer changes change the reference for the zero-crossing detector to detect the zero crossings. As a result, even if a sudden load change occurs and the output of each phase of the generator rises and oscillates only in the positive voltage region, the detection reference changer changes the reference for the zero-crossing detector to detect the zero crossings, thereby making it possible to appropriately detect the zero crossings. Therefore, the battery charger can perform the zero-crossing control even when a sudden load change occurs.

BRIEF DESCRIPTION OF THE DRAWINGS

The above features and advantages of the present invention will be more apparent from the following description of certain preferred embodiments taken in conjunction with the accompanying drawings.

FIG. 2 is a block diagram showing an example of a gate detector according to the first embodiment.

FIG. 3 is a diagram showing a processing example of a gate detector according to the first embodiment.

DETAILED DESCRIPTION

The present invention will now be described herein with reference to illustrative embodiments. The size and the like of each illustrated portion might be different from those of each portion of an actual device.

Those skilled in the art will recognize that many alternative embodiments can be accomplished using the teachings of the present invention and that the present invention is not limited to the embodiments illustrated herein for explanatory purposes.

First Embodiment

Figure 1:
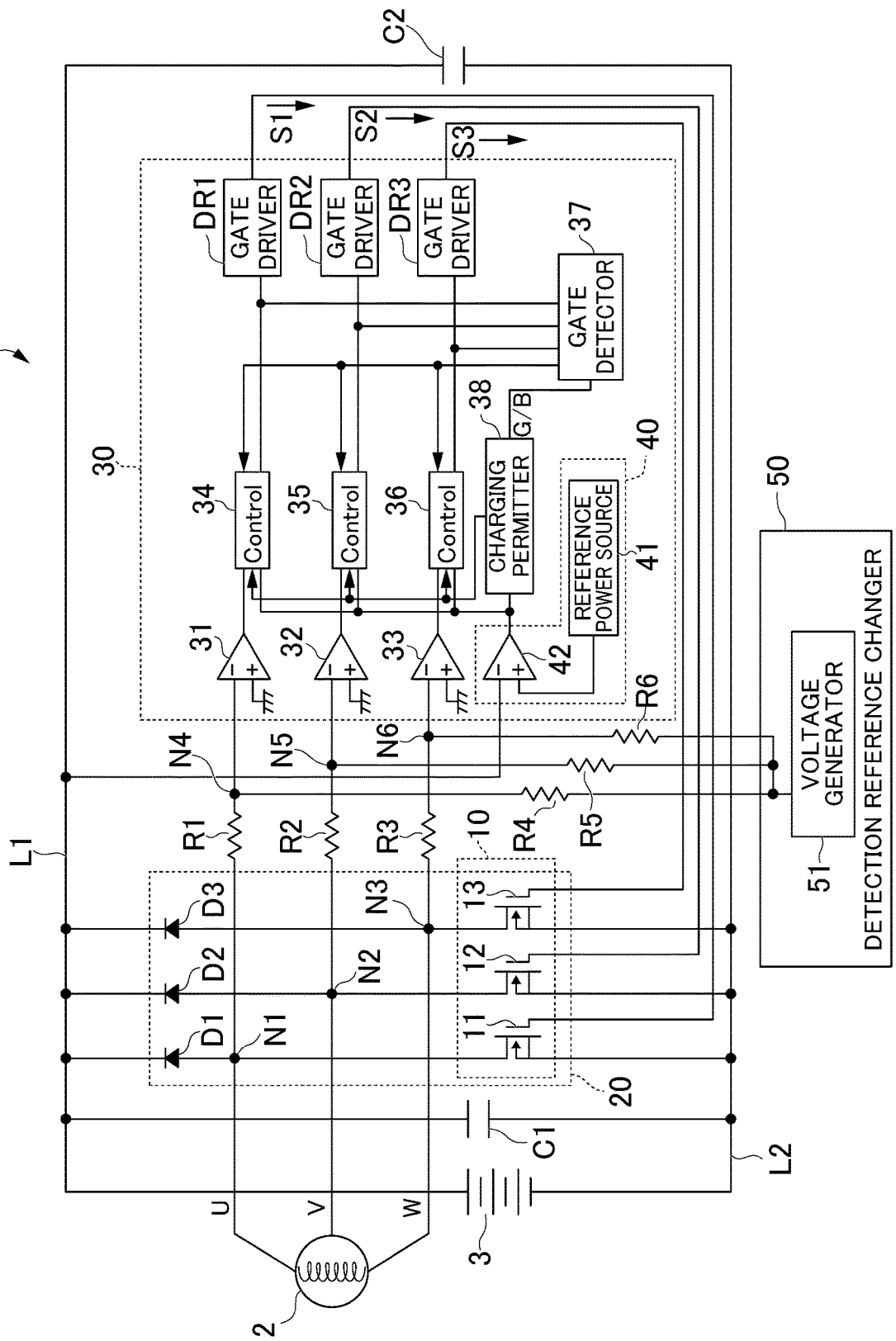
FIG. 1 is a block diagram showing an example of a battery charger according to a first embodiment.

FIG. 1 is a block diagram showing an example of a battery charger 1 according to the first embodiment.

As shown in FIG. 1, the battery charger 1 includes a rectifier 20, a control circuit 30, a detection reference changer 50, capacitors (C1, C2), and resistors R1 to R6.

The battery charger 1 charges a battery 3 by rectifying three-phase AC signals of U, V, and W phases supplied from an ACG 2.

The ACG 2 (an example of a power generator) is a permanent magnet three-phase AC generator. The ACG 2 generates AC power based on rotational energy of an engine of a motorcycle or the like, and outputs three-phase AC signals of the U, V, and W phases, as the generated AC power.

The battery 3 is a secondary battery, such as a lead storage battery or a lithium ion battery. The battery 3 supplies power to a load and is charged with the power generated by the ACG 2 based on control of the battery charger 1. The battery 3 has a positive terminal connected to a power line L1 and a negative terminal connected to a power line L2.

The capacitors C1 and C2 are smoothing capacitors connected between the power lines L1 and L2. The capacitors C1 and C2 remove and smoothen noise of DC voltages between the power lines L1 and L2.

The rectifier 20 rectifies the three-phase AC voltages output from the ACG 2 and charges the battery 3. The rectifier 20 includes diodes D1 to D3 (an example of rectifier elements) corresponding respectively to the U, V, and W phases. The rectifier 20 includes the diodes D1 to D3 and a switch 10, rectifies the three-phase (U, V, W) AC voltage output from the ACG 2 to generate DC voltages, and charges the battery 3.

Each of the diodes D1 to D3 has a cathode terminal connected to the positive terminal (power supply line L1) of the battery 3.

The diode D1 has an anode terminal connected to a U-phase output line (node N1) of the ACG 2. The diode D2 has an anode terminal connected to a V-phase output line (node N2) of the ACG 2. The diode D3 has an anode terminal connected to a W-phase output line (node N3) of the ACG 2.

The switch 10 is provided for the diodes D1 to D3. The switch 10, in an off state, rectifies the AC voltage to charge the battery 3. The switch 10, in an on state, short-circuits an output of each phase (U, V, W) of the ACG 2 to a negative terminal (negative side) of the battery 3. The switch 10 includes MOSFETs (Metal-Oxide-Semiconductor Field Effect Transistors) 11 to 13.

The MOS transistor 11 has a drain terminal connected to the anode terminal (node N1) of the diode D1, a gate terminal connected to a signal line of a control signal S1 output from the control circuit 30 described later, and a source terminal connected to the power supply line L2. When turned on, the MOS transistor 11 short-circuits the U-phase output line (node N1) to the negative terminal (power supply line L2) of the battery 3.

The MOS transistor 12 has a drain terminal connected to the anode terminal (node N2) of the diode D2, a gate terminal connected to a signal line of a control signal S2 output from the control circuit 30 described later, and a source terminal connected to the power supply line L2. When turned on, the MOS transistor 12 short-circuits the V-phase output line (node N2) to the negative terminal (power supply line L2) of the battery 3.

The MOS transistor 13 has a drain terminal connected to the anode terminal (node N3) of the diode D3, a gate terminal connected to a signal line of a control signal S3 output from the control circuit 30 described later, and a source terminal connected to the power supply line L2. When turned on, the MOS transistor 13 short-circuits the W-phase output line (node N3) to the negative terminal (power supply line L2) of the battery 3.

For example, the MOS transistors 11 to 13 are N-channel MOS transistors. The MOS transistors 11 to 13 are turned on and turned into an L state (low state) when the gate terminal is in an H state (high state). That is, when the control signal S1 is in the H state, the MOS transistor 11 is turned on, and the U-phase output line connected to the anode terminal of the diode D1 is connected to the power supply line L2. For this reason, the U-phase output line is short-circuited to the negative terminal of the battery 3, and the U-phase AC voltage becomes the voltage of the negative terminal of the battery 3. Therefore, in this case, the U-phase AC voltage is not output from the diode D1.

Additionally, when the control signal S1 is in the L state, the MOS transistor 11 is turned off, and the U-phase output line connected to the anode terminal of the diode D1 and the power supply line L2 are disconnected, so that the U-phase AC voltage is output from the diode D1.

Similarly, when the control signal S2 is in the H state, the MOS transistor 12 is turned on, and the V-phase output line connected to the anode terminal of the diode D2 is connected to the power supply line L2, so that the V-phase output line is short-circuited to the negative terminal of the battery 3, and the V-phase AC voltage becomes the voltage of the negative terminal of the battery 3. Therefore, in this case, the V-phase AC voltage is not output from the diode D2.

Further, when the control signal S2 is in the L state, the MOS transistor 12 is turned off, and the V-phase output line connected to the anode terminal of the diode D2 is disconnected from the power supply line L2, so that the V-phase AC voltage is output from the diode D2.

Similarly, when the control signal S3 is in the H state, the MOS transistor 13 is turned on, and the W-phase output line connected to the anode terminal of the diode D3 is connected to the power supply line L2, so that the W-phase output line is short-circuited to the negative terminal of the battery 3, and the W-phase AC voltage becomes the voltage of the negative terminal of the battery 3. Therefore, in this case, the W-phase AC voltage is not output from the diode D3.

Further, when the control signal S3 is in the L state, the MOS transistor 13 is turned off, and the W-phase output line connected to the anode terminal of the diode D3 is disconnected from the power supply line L2, so that the W-phase AC voltage is output from the diode D2.

The resistor R1 is connected between the nodes N1 and N4, the resistor R2 is connected between the nodes N2 and N5, and the resistor R3 is connected between the nodes N3 and N6. That is, the U-phase output signal is supplied to the control circuit 30 via the resistor R1, the V-phase output signal is supplied to the control circuit 30 via the resistor R2, and the W-phase output signal is supplied to the control circuit 30 via the resistor R3.

The control circuit 30 (an example of a switch controller) controls the switch 10 (MOS transistors 11 to 13) according to the output signals of the U, V, and W phases. The control circuit 30 controls the control signals S1 to S3 to be in the L state in accordance with the positive potential phases of the three-phase (U, V, W) AC voltage, and controls the control signals S1 to S3 to be in the H state in accordance with the negative potential phases of the three-phase (U, V, W) AC voltage.

The control circuit 30 controls the rectifier 20 so as to stop charging when the charging voltage of the battery 3 is equal to or higher than a preset threshold voltage, and to perform charging when the charging voltage is lower than the preset threshold voltage. Further, the control circuit 30 detects the presence or absence of a bias of an excitation current which causes an occurrence of biased excitation in the three-phase AC voltage supplied from the ACG 2, and controls the rectifier 20 so as to eliminate the bias of the excitation current.

The control circuit 30 includes comparators 31 to 33, gate controllers 34 to 36, a gate detector 37, a charging permitter 38, a charge voltage detector 40, and gate drivers DR1 to DR3.

The comparators 31 to 33 (an example of a zero-crossing detector) detect zero crossings of the respective phases of the AC voltages. That is, the comparators 31 to 33 detect the phases of the three-phase (U, V, and W) AC voltage. Non-inverting input terminals (+ terminals) of the comparators 31 to 33 are grounded (connected to the negative terminal (0V) of the battery 3).

The comparator 31 has: an inverting input terminal (− terminal) connected to the node N1 and supplied with the U-phase AC voltage; and an output terminal connected to the gate controller 34. The comparator 31 compares a voltage value of the ground potential and a voltage value of the U-phase AC voltage. The comparator 31 outputs a H-state signal from the output terminal when the U-phase AC voltage is lower than the ground potential. When the U-phase AC voltage is higher than the ground potential, the comparator 31 outputs a L-state signal from the output terminal. As a result, the comparator 31 detects a phase in which the U-phase voltage value has a negative potential (negative polarity).

Similarly, the comparator 32 has: an inverting input terminal (− terminal) connected to the node N2 and supplied with the V-phase AC voltage; and an output terminal connected to the gate controller 35. The comparator 32 compares a voltage value of the ground potential and a voltage value of the V-phase AC voltage. The comparator 32 outputs a H-state signal from the output terminal when the V-phase AC voltage is lower than the ground potential. When the V-phase AC voltage is higher than the ground potential, the comparator 32 outputs a L-state signal from the output terminal. As a result, the comparator 32 detects a phase in which the V-phase voltage value is a negative potential (negative polarity).

Similarly, the comparator 33 has: an inverting input terminal (− terminal) connected to the node N3 and supplied with the W-phase AC voltage; and an output terminal connected to the gate controller 36. The comparator 33 compares a voltage value of the ground potential and a voltage value of the W-phase AC voltage. The comparator 33 outputs a H-state signal from the output terminal when the W-phase AC voltage is lower than the ground potential. When the W-phase AC voltage is higher than the ground potential, the comparator 33 outputs a L-state signal from the output terminal. As a result, the comparator 33 detects a phase in which the W-phase voltage value is a negative potential (negative polarity).

The charging voltage detector 40 detects a charged voltage value of the battery 3, and compares the charged voltage value with a preset threshold voltage value indicating the full charge. As a result of the comparison, when the charged voltage value is less than the threshold voltage value, the charging voltage detector 40 outputs a charging signal in the H state. When the charging voltage value is equal to or higher than the threshold voltage, the charging voltage detector 40 makes an output thereof in the L state and does not output a charging signal.

Additionally, the charging voltage detector 40 includes a reference power supply 41 and a comparator 42.

The reference power supply 41 generates a reference voltage value Vref as the above-described threshold voltage for detecting whether or not the voltage value Ve of the charging voltage indicates the full charge.

The comparator 42 has an inverting input terminal (− terminal) connected to the power line L1 and supplied with the charging voltage of the battery 3. Although not shown, the charging voltage of the battery 3 may be divided and compared with the reference voltage value Vref as the voltage value Ve.

The comparator 42 has the inverting input terminal (− terminal) supplied with the voltage value Ve and the non-inverting input terminal (+ terminal) supplied with the reference voltage Vref, and compares the voltage value Ve with the voltage value Vref. When the voltage value Ve is less than the voltage value Vref, the comparator 42 determines that the charging is not full and need be performed, and outputs a H-state charging signal from the output terminal. Also, when the voltage value Ve is equal to or higher than the voltage value Vref, the comparator 42 determines that the charging is full and need be stopped, and outputs a L-state charging signal from the output terminal. That is, in this case, the comparator 42 does not output a charging signal.

Here, when the output of the charging voltage detector 40 is in the H state, it is assumed that the charging signal is being output.

The gate controller 34 outputs a H-state signal (control signal S1) from the output terminal when the charging signal is supplied from the charging voltage detector 40, a charging permission signal is supplied from the charging permitter 38, and the output of the comparator 31 is in the H state. In addition, the gate controller 34 outputs a L-state signal when the charging signal is supplied from the charging voltage detector 40, the charging permission signal is supplied from the charging permitter 38, and the output of the comparator 31 is in the L state.

Further, when the charging signal is not supplied from the charging voltage detector 40 or when the charging permission signal is not supplied from the charging permitter 38, irrespective of the state of the output of the comparator 31, the gate controller 34 outputs a H-state signal from the output terminal to make the non-charging state.

Similarly, the gate controller 35 outputs a H-state signal (control signal S2) from the output terminal when the charging signal is supplied from the charging voltage detector 40, the charging permission signal is supplied from the charging permitter 38, and the output of the comparator 32 is in the H state. Additionally, the gate controller 35 outputs a L-state signal from the output terminal when the charging signal is supplied from the charging voltage detector 40, the charging permission signal is supplied from the charging permitter 38, and the output of the comparator 31 is in the L state.

Further, when the charging signal is not supplied from the charging voltage detector 40 or when the charging permission signal is not supplied from the charging permitter 38, irrespective of the state of the output of the comparator 31, the gate controller 35 outputs a H-state signal from the output terminal to make the non-charging state.

Similarly, the gate controller 36 outputs a H-state signal (control signal S3) from the output terminal when the charging signal is supplied from the charging voltage detector 40, the charging permission signal is supplied from the charging permitter 38, and the output of the comparator 33 is in the H state. Additionally, the gate controller 36 outputs a L-state signal from the output terminal when the charging signal is supplied from the charging voltage detector 40, the charging permission signal is supplied from the charging permitter 38, and the output of the comparator 32 is in the L state.

Further, when the charging signal is not supplied from the charging voltage detector 40 or when the charging permission signal is not supplied from the charging permitter 38, irrespective of the state of the output of the comparator 33, the gate controller 36 outputs a H-state signal from the output terminal to make the non-charging state.

Thus, each of the gate controllers 34 to 36 applies a positive bias (H state) to the corresponding one of the gate terminals of the MOS transistors 11 to 13 when the AC voltage of the corresponding phase is a negative potential in the charging state, so that rectified currents flow through the MOS transistors 11 to 13 to perform synchronous rectification. In the non-charging state, each of the gate controllers 34 to 36 simultaneously applies a positive bias to the corresponding one of the gate terminals of the MOS transistors 11 to 13 to short-circuit the corresponding phase of the ACG 2 to the negative terminal of the battery 3, thus preventing overcharging.

The charging permitter 38 outputs a charging permission signal (output of the H-state signal) when a gate normal signal G is supplied from the gate detector 37 while the charging signal is supplied from the charging voltage detector 40. Further, the charging permitter 38 stops the charging permission signal (outputs of the L-state signal) when the gate normal signal G is supplied from the gate detector 37 while the charging signal is not supplied.

That is, the charging permitter 38 sets the charging permission signal to be output in the H state when the gate normal signal G is supplied while the charging signal is supplied from the charging voltage detector 40. The charging permitter 38 sets the charging permission signal to be output in the L state when the gate normal signal G is supplied while the charging signal is not supplied from the charging voltage detector 40.

Further, the charging permitter 38 sets the charging permission signal to be output in the L state when a gate abnormal signal B is supplied while the charging signal is supplied from the charging voltage detector 40.

As a result, the gate controllers 34 to 36 apply the L-state voltage to the gate terminals of the MOS transistors 11 to 13 in accordance with the positive potential phase of the three-phase AC voltage. The gate controllers 34 to 36 apply the H-state voltage in accordance with the negative potential phase of the three-phase AC voltage, thus performing control for charging the battery 3.

Further, when a full charge signal is supplied, the charging permitter 38 does not output the charging permission signal to the gate controllers 34 to 36.

As a result, the gate controllers 34 to 36 apply the H state voltage to the gate terminals of the MOS transistors 11 to 13, irrespective of the negative potential phase of the three-phase AC voltage, thus performing control for stopping the charging of the battery 3.

In this case, the gate detector 37 described later outputs the above-described gate normal signal G or gate abnormal signal B in units of the three phases (U, V, W). For this reason, in the battery charger 1, the control of switching between the charging state and the non-charging state is performed synchronously in units of the three phases (U, V, W), thus suppressing the occurrence of the bias of the exciting current among the three phases (U, V, W).

In order to detect the bias of the exciting current in units of three phases (U, V, W), the gate detector 37 determines whether or not the control signals S1, S2, and S3 are output sequentially from the gate controllers 34 to 36. That is, the gate detector 37 determines whether or not all the control signals S1, S2, and S3 are supplied in order of the three phases (U, V, W).

For example, when the control signal S1 in the H state is output from the gate controller 34 in response to the supply of the U-phase, that is, when the charging is started from the U-phase and it is detected that the control signals are supplied in order of S1→S2→S3, the gate detector 37 outputs the gate normal signal G. Similarly, when the control signal S3 in the H state is output from the gate controller 36 in response to the supply of the W phase, that is, when the charging is started from the W-phase and it is detected that the control signals are supplied in order of S3→S1→S2, the gate detector 37 outputs the gate abnormal signal B.

That is, the gate detector 37 detects whether or not the control signals are constantly circulated in order of S1→S2→S3 in the charging state. When any one of the control signals S1, S2, and S3 is lost so that the signals S1, S2, and S3 are not output in this order, the gate detector 37 outputs the gate abnormal signal B to the gate controllers 34 to 36 to stop the charging as an abnormal state.

Therefore, in response to the supply of the U-phase, the gate detector 37 outputs the gate abnormal signal B when the control signal S1 in the H state is output from the gate controller 34, cyclic detection of whether or not the control signals S1, S2, and S3 are output in this order is started from the U-phase, and the first detected control signal is output again. Here, examples of the case where the first detected control signal is output again includes an example, such as S1→S2→S1 or S1→S3→S1, where the first detected control signal (S1 in this example) is output again, instead of all the three control signals S1, S2, and S3 being supplied.

Here, a configuration example of the gate detector 37 will be described with reference to FIG. 2, FIG. 2 is a block diagram showing an example of the gate detector 37 according to the present embodiment.

As shown in FIG. 2, the gate detector 37 includes latches 371 to 373, and a normality confirmator 374.

When the control signal S1 in the H state is supplied, the latch 371 outputs a latch signal in the H-state. When the control signal S2 in the H state is supplied, the latch 372 outputs a latch signal in the H state. When the control signal S3 in the H state is supplied, the latch 373 outputs a H-state latch signal.

In the order of the latches 371 to 373 (order of the U-phase, the V-phase, and the W-phase), when the H-state latch signals are supplied from all the three latches, sequentially from the latch that first outputs the H-state latch signal, the normality confirmator 374 outputs the gate normal signal G. Further, the normality confirmator 374 outputs the gate abnormal signal B when the H-state latch signal is resupplied from the latch that first outputs the H-state latch signal while the H-state latch signal is not supplied from one or both of the two latches other than the latch that first outputs the H-state latch. That is, the normality confirmator 374 outputs to each of the gate controllers 34 to 36, the gate normal signal G or the gate abnormal signal B based on whether or not all the three latches sequentially output the H-state latch signals in the circulation of the latch 371→the latch 372→the latch 373.

For example, the gate detector 37 outputs the gate abnormal signal B when the H-state latch signal is supplied first from the latch 372, the H-state latch signal is supplied next from the latch 373, the H-state latch signal is not supplied from the latch 371, and the H-state latch signal is resupplied from the latch 372 while the H-state latch signal is not supplied from the latch 371.

That is, the normality confirmator 374 operates according to a logic shown in the table of FIG. 3.

In a case where the normality confirmator 374 detects whether or not the latch signals in the H state are supplied sequentially from the latch 371 corresponding to the control signal S1, when the latch signals are supplied in the order of S1→S2→S3, the normality confirmator 374 outputs a reset signal to the latches 371 to 373, and outputs a gate normal signal G to the charging permitter 38. The normality confirmator 374 holds the gate normal signal G in a cycle for detecting that the next latch signals are sequentially supplied, that is, until the next latch signal is supplied.

When the latch signal in the H state is supplied first from the latch 371 corresponding to the control signal S1, such as in the order of S1→S2→S1, S1→S3→S1, or S1→S1, that is, when the latch signal corresponding to the first supplied control signal is resupplied while the other one or two latch signals corresponding to the control signals other than the first supplied control signal are not supplied, the normality confirmator 374 outputs a reset signal to the latches 371 to 373, and outputs a pulse-like gate abnormal signal B.

In this manner, as shown in FIG. 3, in a case where the supply of the control signal in the H state is started from the control signal S2 or the control signal S3, the normality confirmator 374 similarly detects gate abnormality when the control signals are not supplied in the order of the U-phase, V-phase, and W-phase, instead, the control signal corresponding to the first supplied phase is resupplied while the one or two control signals corresponding to the other one or two phases are not supplied.

Here, the gate abnormal signal B is supplied to all the gate controllers 34 to 36. When the gate abnormal signal B is supplied, the gate controllers 34 to 36 each forcibly output the H-state control signals (S1, S2, S3) for a preset time width, such as an integral multiple of the three-phase period, even if the charging signal and the charging permission signal are output respectively from the charging voltage detector 40 and the charging permitter 38, and even if corresponding phase detection signals are not supplied.

By this processing, even if zero crossing is not detected for some reason, it is possible to reset the bias of the exciting current which causes the biased excitation among the three phases of the AC voltages of the ACG 2, thus making it possible to equalize the voltage values among the three phases and restart the charging control synchronously in units of the three phases.

Next, returning to FIG. 1, the gate drivers DR1 to DR3 output control signals S1, S2 and S3 respectively to the gate terminals of the MOS transistors 11 to 13. That is, the gate driver DR1 converts the control signal S1 output from the gate controller 34 into an output signal for controlling the MOS transistor 11, and supplies the control signal S1 to the gate terminal of the MOS transistor 11. Further, the gate driver DR2 converts the control signal S2 output from the gate controller 35 into an output signal for controlling the MOS transistor 12, and supplies the control signal S2 to the gate terminal of the MOS transistor 12. Further, the gate driver DR3 converts the control signal S3 output from the gate controller 36 into an output signal for controlling the MOS transistor 13, and supplies the control signal S3 to the gate terminal of the MOS transistor 13.

The detection reference changer 50 changes a reference for the comparators 31 to 33 described above to detect zero crossings. The detection reference changer 50 applies, via resistors R4 to R6 described later, an offset voltage such as a predetermined negative voltage, to the nodes N4 to N6 which are detection nodes where the comparators 31 to 33 detect zero crossings of the respective phases of the AC voltages, thus changing the zero-crossing detection reference.

Further, the detection reference changer 50 includes a voltage generator 51.

The voltage generator 51 generates the offset voltage that is the predetermined negative voltage. The voltage generator 51 generates the negative voltage (for example, −5V) using a charge pump circuit as shown in FIG. 4

Figure 4:
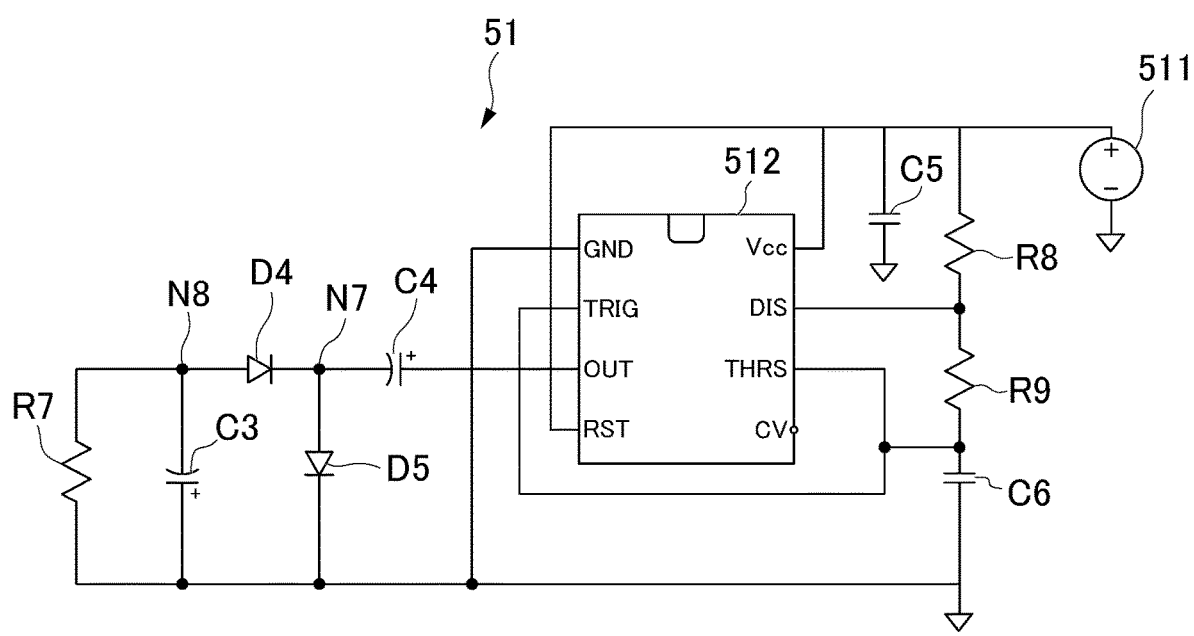
FIG. 4 is a block diagram showing an example of a voltage generator according to the first embodiment.

FIG. 4 is a block diagram showing an example of the voltage generator 51 according to the present embodiment.

As shown in FIG. 4, the voltage generator 51 includes a power supply circuit 511, a timer IC 512, resistors R7 to R9, capacitors C3 to C6, and diodes D4 and D5.

The power supply circuit 511 generates a DC voltage of, for example, 5V. The capacitor C5 is a smoothing capacitor and is connected between a power line of 5V generated by the power circuit 511 and a GND power line.

The timer IC 512 is a timer IC, such as NE555 manufactured by Texas Instruments, and functions as a clock generation circuit (oscillation circuit) that generates a 5V clock signal by setting a mode using the resistors R8 and R9 and the capacitor C6. The timer IC 512 outputs the 5V clock signal from an OUT terminal.

The resistor R8, the resistor R9, and the capacitor C6 are connected in series between a −5V power supply line and the GND power supply line. A node between the resistor R8 and the resistor R9 is connected to a DIS terminal of the timer IC 512, while a node between the resistor R9 and the capacitor C6 is connected to a THRS terminal and a TRIG terminal of the timer IC 512. A frequency of the clock signal output from the OUT terminal by the timer IC 512 is determined by resistance values of the resistors R8 and R9 and a capacitance value of the capacitor C6.

The diode D4 has a cathode terminal connected to a node N8 and an anode terminal connected to a node N7. The diode D5 has a cathode terminal connected to the node N7 and an anode terminal connected to the GND power supply line. The diode D4 and the diode D5 are connected in series between a node N8 and the GND power supply line in a forward direction from the node N8 to the GND power supply line.

The capacitor C4 is connected between the OUT terminal of the timer IC 512 and the node N7, and supplies the clock signal to the node N7.

The capacitor C3 and the resistor R7 are connected between the node N8 and the GND power supply line.

The diode D4 and the diode D5, the capacitor C3 and the resistor R7, and the capacitor C4 constitute a charge pump circuit in which the clock signal is input via the capacitor C4 to the node N7 that is between the diodes D4 and D5 connected in series, so that the voltage of −5V is generated at the node N8.

The voltage generator 51 supplies the offset voltage of −5V from the node N8 to the detection nodes N4 to N6 via the resistors R4 to R6 to change the zero-crossing detection reference.

The resistors R4 to R6 are connected between the node N8 of the voltage generator 51 and the detection nodes N4 to N6. The resistors R4 to R6 are adjustment resistors for supplying an appropriate negative offset voltage. The resistor R4 is connected between the node N8 and the node N4, and adjusts the offset voltage for changing the reference for the comparator 31 to detect a zero crossing of the U-phase. Further, the resistor R5 is connected between the node N8 and the node N5, and adjusts the offset voltage for changing the reference for the comparator 32 to detect a zero crossing of the V-phase. Further, the resistor R6 is connected between the node N8 and the node N6, and adjusts the offset voltage for changing the reference for the comparator 33 to detect a zero crossing of the W-phase.

As described above, the detection reference changer 50 supplies, via the resistors, the offset voltage generated by the voltage generator 51 to the detection nodes where the comparators 31 to 33 detect zero crossings of the respective phases of the AC voltage, thus changing the reference for detecting zero crossings.

Next, operation of the detection reference changer 50 according to the present embodiment will be described with reference to FIG. 5.

FIG. 5 is a diagram illustrating an operation example of the battery charger 1 according to the present embodiment.

Figure 5A:
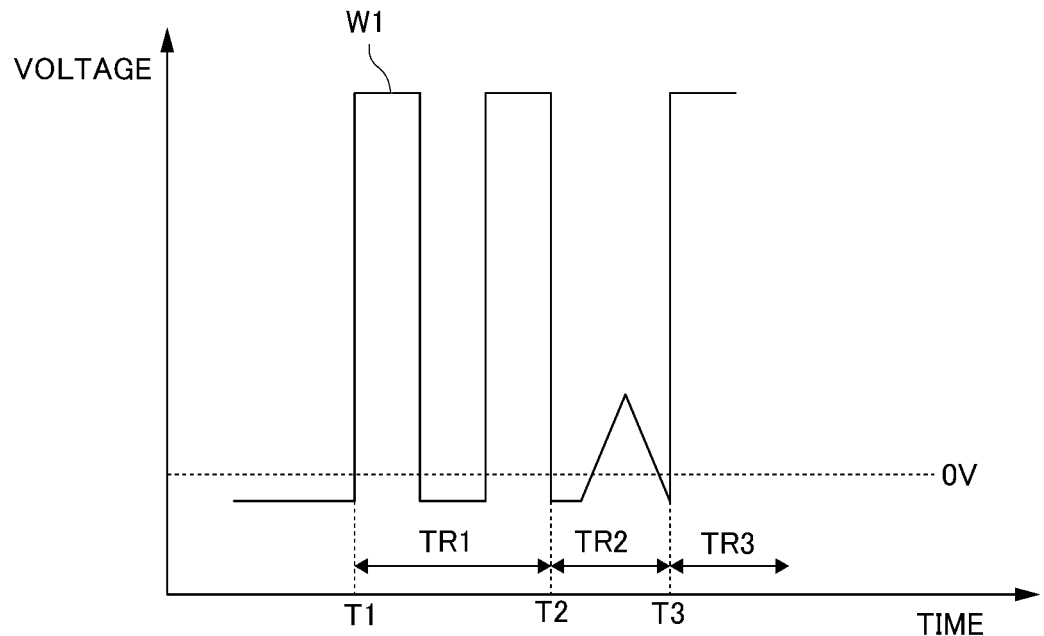
FIGS. 5A and 5B are diagrams illustrating operation examples of the battery charger according to the first embodiment.

FIG. 5A shows an operation example of zero-crossing control in a case where the detection reference changer 50 according to the present embodiment is not used. In contrast, FIG. 5B shows an operation example of zero-crossing control in the present embodiment in a case where the detection reference changer 50 is used.

In FIG. 5A, a waveform W1 indicates a voltage waveform of the node N4. A horizontal axis of the graph indicates time. Further, a period TR1 from time T1 to time T2 and a period TR3 after time T3 are OFF periods of the MOS transistor 11. Further, a period TR2 from time T2 to time T3 is an ON period of the MOS transistor 11.

Figure 5B:
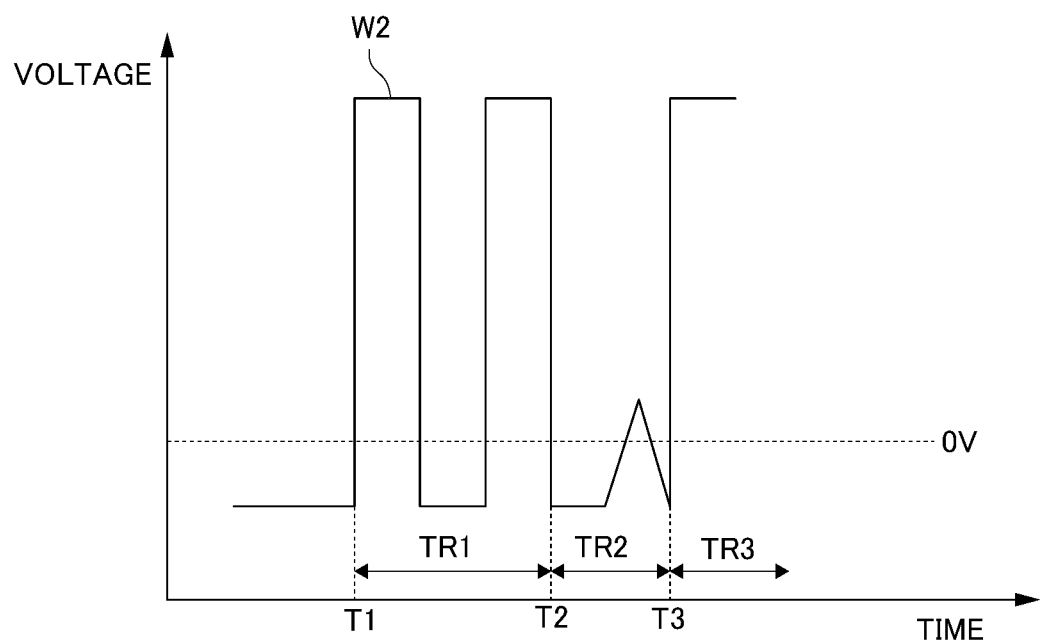

In FIG. 5B, a waveform W2 indicates a waveform corresponding to the waveform W1 of FIG. 5A in the case where the detection reference changer 50 of the present embodiment is used.

In FIG. 5A, for example, when a battery voltage is high and a sudden load change occurs, such as in a racing motorcycle, the control of the charging permitter 38 alone may not sufficiently suppress generation of a load bias among the phases. That is, as at time T3 that is a zero-crossing point of the waveform W1, there arises a case where the AC output of ACG 2 rises, and a sufficient amplitude in the negative voltage region for the zero-crossing control cannot be obtained, thereby making it difficult to perform zero-crossing control in some conventional cases.

On the other hand, as shown in FIG. 5B, in the case where the detection reference changer 50 of the present embodiment is used, as shown in the waveform W2, the detection reference changer 50 supplies the offset voltage that is the predetermined negative voltage and thereby shifts the potential of the detection node N4 to the negative voltage side, thereby sufficiently ensuring the amplitude in the negative voltage region. Thus, the battery charger 1 can appropriately perform zero-crossing control even in the case where a battery voltage is high and a sudden load change occurs, such as in a racing motorcycle.

As described above, the battery charger 1 according to the present embodiment includes the rectifier 20, the switch 10, the comparators 31 to 33 (zero-crossing detectors), the control circuit 30 (switch controller), and the detection reference changer 50. The rectifier 20 includes the diodes D1 to D3 (rectifier elements) for the three phases (U, V, W) that rectify the three-phase AC voltages output from the ACG 2 (power generator) to charge the battery 3. The MOS transistors 11 to 13 of the switch 10 are provided respectively for the diodes D1 to D3. The MOS transistors 11 to 13, in the off-state, rectify the AC voltages to charge the battery 3. The MOS transistors 11 to 13, in the on-state, short-circuit the outputs of the respective phases of the ACG 2 to the negative side of the battery 3. The comparators 31 to 33 (zero-crossing detectors) detect zero-crossings of the respective phases of the AC voltage. The control circuit 30 (switch controller) outputs a gate signal for turning on/off the switch 10 (MOS transistors 11 to 13), based on the result of the zero crossing detection by the comparators 31 to 33. The detection reference changer 50 changes the reference for the comparators 31 to 33 to detect the zero crossing.

Thus, in the battery charger 1 according to the present embodiment, even if a sudden load change occurs, the output of each phase (U, V, W) of the ACG 2 rises and swings only in the positive voltage region, the detection reference changer 50 changes the reference for the comparators 31 to 33 to detect zero crossings, thereby making it possible to appropriately detect zero crossings. Therefore, the battery charger 1 according to the present embodiment can perform the zero-crossing control even when a sudden load change occurs (see FIG. 5B).

In the present embodiment, the detection reference changer 50 includes the voltage generator 51 that generates the offset voltage that is the predetermined negative voltage. The comparators 31 to 33 output, via the resistors R4 to R6, the offset voltage generated by the voltage generator 51 to the detection nodes N4 to N6 that detect the zero crossings of the respective phases (U, V, W) of the AC voltages, thus changing the zero-crossing detection reference.

Thus, the battery charger 1 according to the present embodiment includes the voltage generator 51, and supplies the offset voltage that is the predetermined negative voltage, to the detection nodes N4 to N6 via the resistors R4 to R6, thereby making it possible to easily change the zero-crossing detection reference with the simple configuration.

Second Embodiment

Next, a battery charger 1a according to a second embodiment will be described with reference to the drawings.

In the present embodiment, description will be given with respect to a modified example where a reference voltage for the comparators 31 to 33, instead of the offset voltage of the first embodiment, is changed to change the zero-crossing detection reference.

Figure 6:
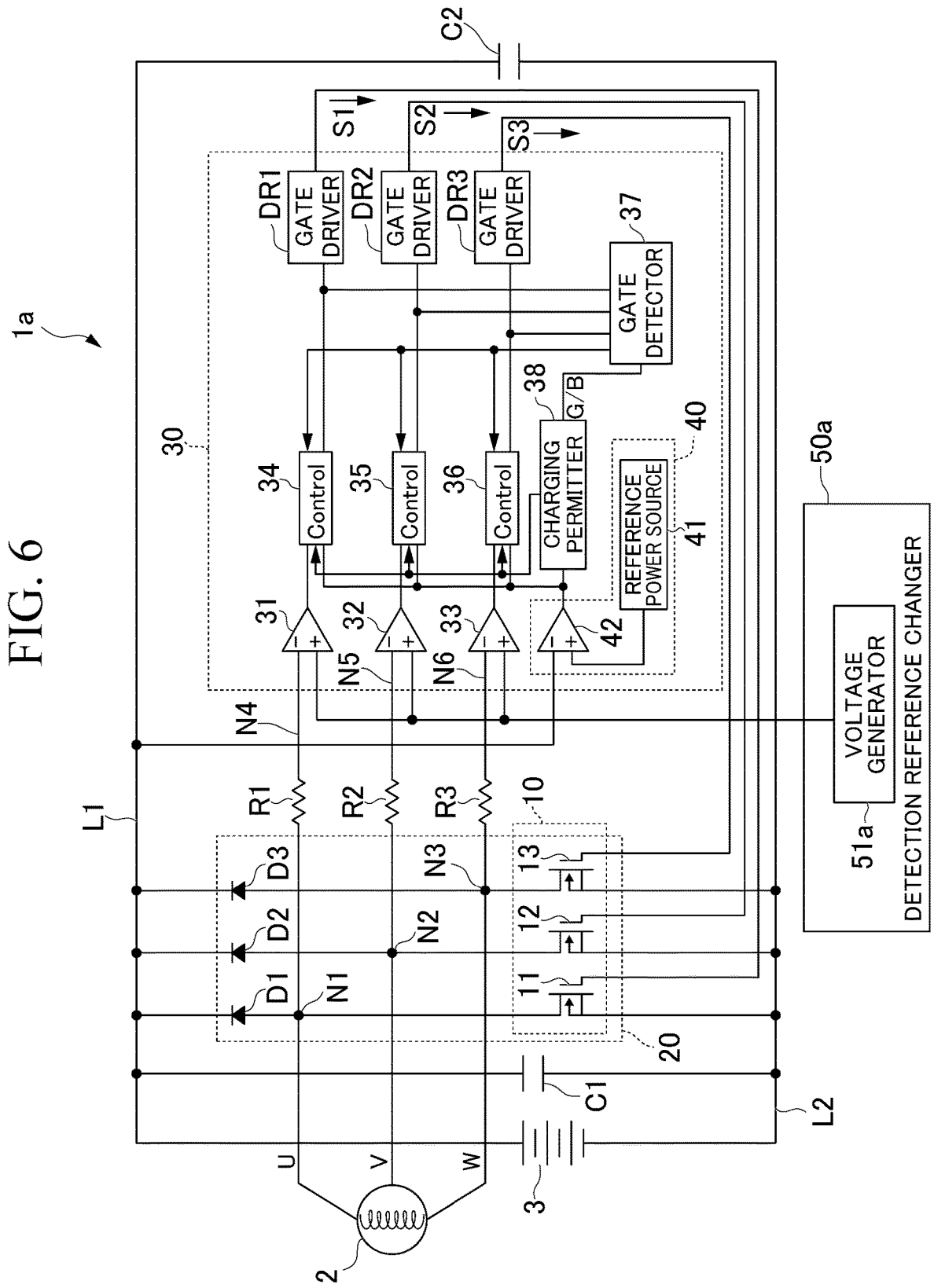
FIG. 6 is a block diagram showing an example of a battery charger according to a second embodiment.

FIG. 6 is a block diagram showing an example of the battery charger 1a according to the present embodiment.

As shown in FIG. 6, the battery charger 1a includes the rectifier 20, the control circuit 30, a detection reference changer 50a, and the capacitors C1 and C2.

In FIG. 6, the same components as those in FIG. 1 are denoted by the same reference numerals, and description thereof will be omitted.

A reference voltage, instead of the ground voltage (0V), is supplied to the non-inverting terminals (+ terminals) of the comparators 31 to 33 of the present embodiment. The comparator 31 compares a voltage value of the reference voltage supplied from the detection reference changer 50*a* and the AC voltage of the U-phase. The comparator 31 outputs a H-state signal from the output terminal when the AC voltage of the U-phase is lower than the reference voltage. The comparator 31 outputs a L-state signal from the output terminal when the AC voltage of the U-phase is higher than the reference voltage.

The comparator 32 compares a voltage value of the reference voltage supplied from the detection reference changer 50*a* and the AC voltage of the V-phase. The comparator 32 outputs a H-state signal from the output terminal when the AC voltage of the V-phase is lower than the reference voltage. The comparator 32 outputs a L-state signal from the output terminal when the AC voltage of the V-phase is higher than the reference voltage.

The comparator 33 compares a voltage value of the reference voltage supplied from the detection reference changer 50*a* and the AC voltage of the W-phase. The comparator 33 outputs a H-state signal from the output terminal when the AC voltage of the W-phase is lower than the reference voltage. The comparator 33 outputs a L-state signal from the output terminal when the AC voltage of the W-phase is higher than the reference voltage.

The detection reference changer 50*a* changes the predetermined reference voltage supplied to the non-inverting terminals (+ terminals) of the comparators 31 to 33, thus changing the reference for the comparators 31 to 33 to detect zero crossings.

The detection reference changer 50*a* includes a reference voltage generator 51*a*. The reference voltage generator 51*a* (an example of a reference voltage changer) generates a predetermined positive voltage and changes the zero-crossing detection reference from 0V to a predetermined positive voltage.

Next, operation of the battery charger 1*a* according to the present embodiment will be described with reference to FIG. 7.

Figure 7:
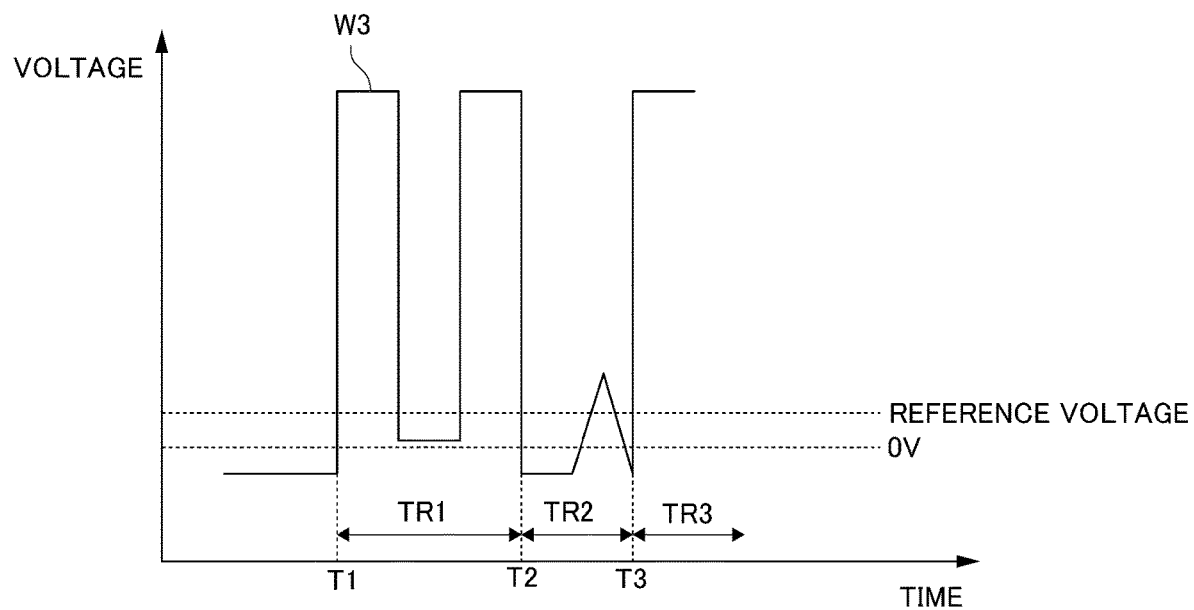
FIG. 7 is a diagram illustrating an operation example of the battery charger according to the second embodiment.

FIG. 7 is a diagram illustrating an operation example of the battery charger 1*a* according to the present embodiment.

In FIG. 7, a waveform W3 indicates a voltage waveform of the node N4 of the present embodiment. A horizontal axis of the graph indicates time. Further, periods TR1 to TR3 are the same as those in FIG. 5.

As shown in FIG. 7, the reference voltage generator 51*a* of the battery charger 1*a* changes the reference voltage from 0V to a predetermined positive voltage higher than 0V. As in FIG. 5(*b*) described above, the reference voltage generator 51*a* changes the reference voltage to the predetermined positive voltage, thus sufficiently ensuring the amplitude in the voltage region that is equal to or lower than the reference voltage for the output of each phase (U, V, W).

As described above, in the battery charger 1*a* according to the present embodiment, the comparators 31 to 33 compare each phase (U, V, W) of the AC voltage with the reference voltage, and detects a zero crossing of each phase (U, V, W). The battery charger 1*a* includes the detection reference changer 50*a*.

The detection reference changer 50*a* includes the reference voltage generator 51*a* that changes the reference voltage. The reference voltage generator 51*a* changes the reference voltage, thereby changing the zero-crossing detection reference.

Thus, the battery charger 1*a* according to the present embodiment changes the reference voltage for the comparators 31 to 33 to detect zero crossings, thereby making it possible to appropriately detect zero crossings even when a sudden load change occurs, the output of each phase (U, V, W) of the ACG 2 rises and swings only in the positive voltage region. Therefore, the battery charger 1*a* according to the present embodiment can perform the zero-crossing control even when a sudden load change occurs, as in the first embodiment described above.

Third Embodiment

Next, a battery charger 1*b* according to a third embodiment will be described with reference to the drawings.

In the present embodiment, description will be given with respect to a modified example where the zero-crossing detection reference is changed according to a load change of a load 4 connected to the battery 3. In the present embodiment, as an example, the description will be given with respect to a case in the second embodiment where the zero-crossing detection reference is changed according to the load change.

Figure 8:
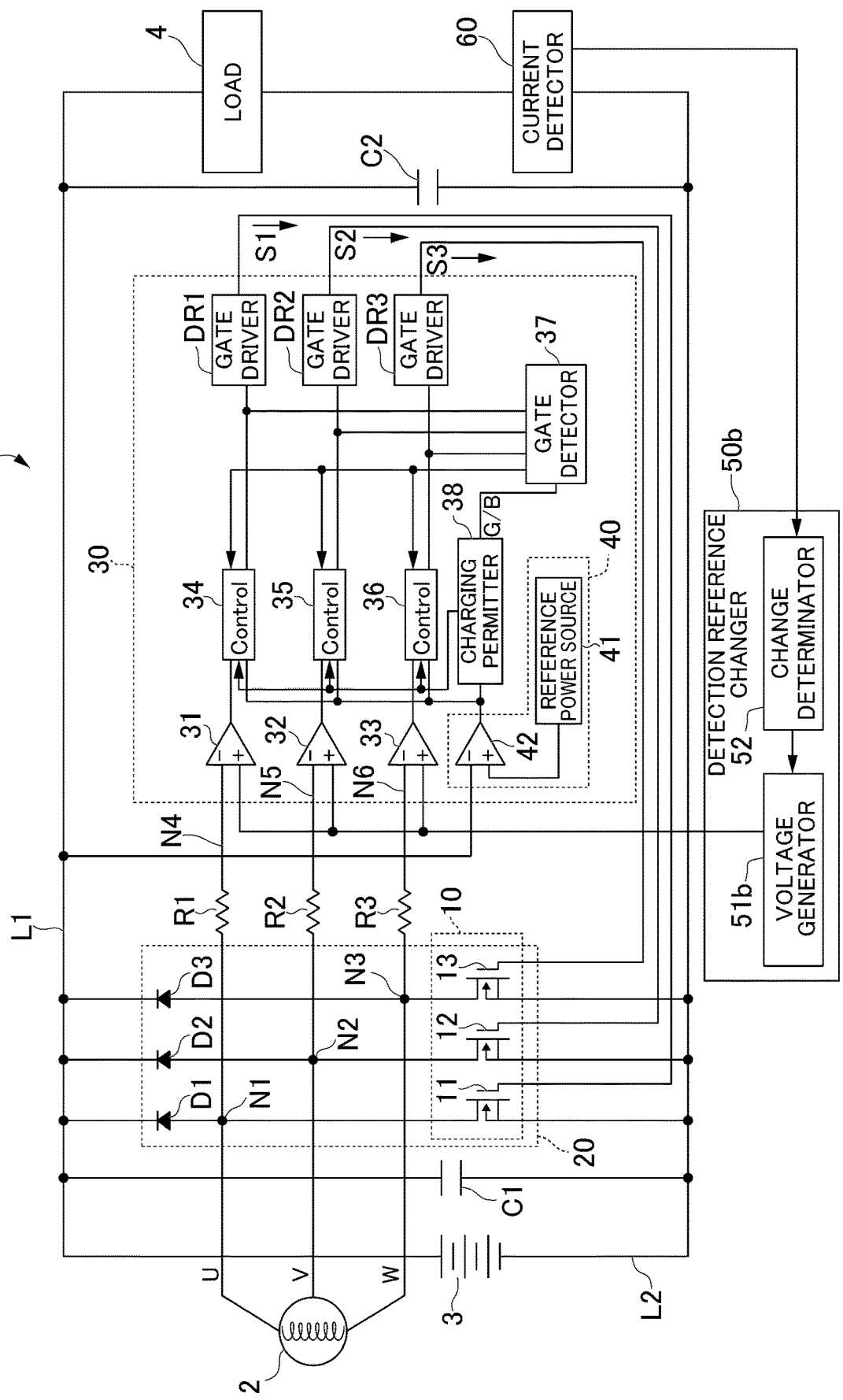
FIG. 8 is a block diagram showing an example of a battery charger according to a third embodiment.

FIG. 8 is a block diagram showing an example of the battery charger 1*b* according to the present embodiment.

As shown in FIG. 8, the battery charger 1*b* includes the rectifier 20, the control circuit 30, a detection reference changer 50*b*, a current detector 60, and the capacitors C1 and C2.

In FIG. 8, the same components as those in FIG. 6 are denoted by the same reference numerals, and description thereof will be omitted.

The current detector 60 detects a value of current flowing through the load 4 using a shunt resistor or the like.

The detection reference changer 50*b* changes the zero-crossing detection reference according to a load change of the load 4 connected to the battery 3. For example, the detection reference changer 50*b* detects a load change based on the current value detected by the current detector 60, and makes a change for increasing the zero-cross reference voltage according to the load change.

The detection reference changer 50*b* includes a reference voltage generator 51*b* and a change determinator 52.

The change determinator 52 acquires the current value detected by the current detector 60, and detects a load change based on a change of the acquired current value. According to the load change, the change determinator 52 outputs to the reference voltage generator 51*b*, an instruction to change the zero-cross reference voltage. Here, the change determinator 52 may be configured to output to the reference voltage generator 51*b*, an instruction to change the zero-cross reference voltage when the load change becomes equal to or greater than a predetermined threshold.

The reference voltage generator 51*b* (an example of a reference voltage changer) changes the zero-crossing detection reference based on the instruction from the change determinator 52. For example, in response to the instruction from the change determinator 52, the reference voltage generator 51*b* changes the zero-crossing detection reference from 0V to a predetermined positive voltage. Here, the reference voltage generator 51*b* may be configured to generate a plurality of reference voltages, switch and output the plurality of reference voltages based on the instruction from the change determinator 52. Additionally, the reference voltage includes 0V (ground voltage).

As described above, the battery charger 1*b* according to the present embodiment includes the detection reference changer 50*b*. The detection reference changer 50*b* changes the zero-crossing detection reference according to the load change of the load 4 connected to the battery 3.

Accordingly, the battery charger 1*b* according to the present embodiment has the same effect as of the second embodiment, and can perform zero-crossing control even when a sudden load change occurs. Further, the battery charger 1b according to the present embodiment changes the zero-crossing detection reference according to the load change, thereby making it possible to use 0V as the detection reference in a normal state where no load change occurs. Therefore, power consumption due to the switching can be further reduced.

Fourth Embodiment

Next, a battery charger 1c according to a fourth embodiment will be described with reference to the drawings.

In the present embodiment, description will be given with respect to a modified example where the zero-crossing detection reference is changed according to a lower limit value of the AC voltage of each phase of the ACG 2. In the present embodiment, the description will be given with respect to a case in the second embodiment where the zero-crossing detection reference is changed according to the lower limit value of the AC voltage of each phase.

Figure 9:
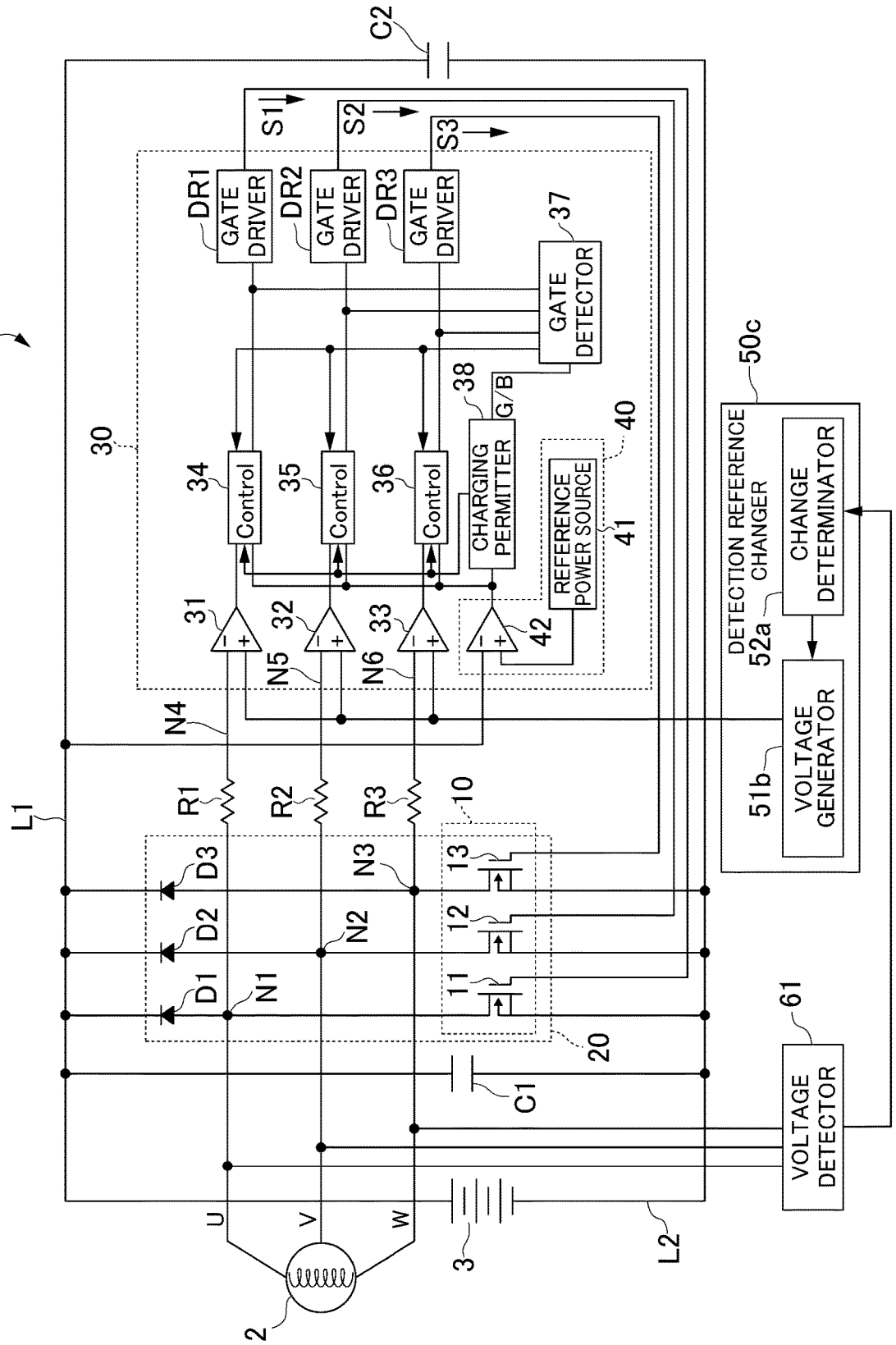
FIG. 9 is a block diagram showing an example of a battery charger according to a fourth embodiment.

FIG. 9 is a block diagram showing an example of the battery charger 1c according to the present embodiment.

As shown in FIG. 9, the battery charger 1c includes the rectifier 20, the control circuit 30, a detection reference changer 50c, a voltage detector 61, and the capacitors C1 and C2.

In FIG. 9, the same components as those in FIG. 8 are denoted by the same reference numerals, and description thereof is omitted.

The voltage detector 61 detects an output voltage of each phase (U, V, W) of the ACG 2 using, for example, an ADC (Analog to Digital Converter) or a comparator.

The detection reference changer 50c changes the zero-crossing detection reference according to a lower limit value of the AC voltage of each phase. For example, the detection reference changer 50c detects the lower limit value (lower limit voltage value) of each phase based on a voltage value of each phase detected by the voltage detector 61, and makes a change for increasing the zero-cross reference voltage according to the lower limit voltage value.

The detection reference changer 50c includes a reference voltage generator 51b and a change determinator 52a.

The change determinator 52a acquires a voltage value of each phase detected by the voltage detector 61, and detects a lower limit voltage value based on the acquired voltage value of each phase. According to the lower limit voltage value, the change determinator 52a outputs to the reference voltage generator 51b, an instruction to change the zero-cross reference voltage. Here, the change determinator 52a may be configured to output to the reference voltage generator 51b, an instruction to change the zero-cross reference voltage when the lower limit voltage value becomes equal to or greater than a predetermined threshold.

As described above, the battery charger 1c according to the present embodiment includes the detection reference changer 50c. The detection reference changer 50c changes the zero-crossing detection reference according to the lower limit value of the AC voltage of each phase (U, V, W) of the ACG 2.

Accordingly, the battery charger 1c according to the present embodiment has the same effects as of the second embodiment, and can perform zero-crossing control even when a sudden load change occurs. Further, the battery charger 1c according to the present embodiment changes the zero-crossing detection reference according to the lower limit value of the AC voltage of each phase (U, V, W) of the ACG 2. Therefore, 0V can be used as the detection reference in the normal state where no load change occurs, thereby making it possible to further reduce power consumption due to the switching.

The present invention is not limited to the above embodiments, and may be modified without departing from the gist of the present invention.

For example, although the description has been given in each of the above embodiments with respect to the case where the battery charger 1 (1a to 1c) includes the gate detector 37 and the charging permitter 38 and has the function of suppressing the occurrence of the bias of the exciting current among the three phases, the present invention is not limited thereto, and includes an embodiment in which the gate detector 37 and the charging permitter 38 are not included.

Additionally, although the description has been given in the second and third embodiments with respect to the example where the present invention is applied to the second embodiment, the present invention is not limited thereto, and may be applied to the first embodiment. That is, the current detector 60 and the change determinator 52 of the third embodiment may be applied to the first embodiment. Further, the voltage detector 61 and the change determinator 52a of the fourth embodiment may be applied to the first embodiment. Here, in this case, the voltage generator 51 may be configured to generate a plurality of offset voltages, switch and output these offset voltages.

Further, although the description has been given in each of the above embodiments with respect to the example where the detection reference changer 50 (50a to 50c) changes the zero-crossing detection reference for all the three phases simultaneously. However, the present invention is not limited thereto, and the zero-crossing detection reference may be changed for each phase individually.

Each component of the battery charger 1 (1a to 1c) described above has a computer system inside. Further, a program for realizing the functions of each component included in the battery charger 1 (1a to 1c) may be recorded on a computer-readable recording medium, so that the above-described processing of each component included in the battery charger 1 (1a to 1c) can be performed by causing the computer system to read and execute the program recorded in the recording medium. Here, "causing the computer system to read and execute the program recorded on the recording medium" includes installing the program in the computer system. The "computer system" here includes an OS and hardware such as peripheral devices.

Further, some or all of the above-described functions may be realized as an integrated circuit, such as an LSI (Large Scale Integration). Each of the above-described functions may be individually formed into a processor, or a part or all of the functions may be integrated into a processor. The method of circuit integration is not limited to an LSI, and may be realized by a dedicated circuit or a general-purpose processor. Further, when the technology for forming an integrated circuit that replaces the LSI appears with the progress of semiconductor technology, an integrated circuit based on that technology may be used.

What is claimed is:
1. A battery charger comprising:
a plurality of rectifier elements respectively configured to rectify alternating current (AC) voltages of three phases output from a power generator;
a plurality of switches respectively for the plurality of rectifier elements configured to, in an off-state, cause the plurality of rectifier elements to rectify the AC voltages to charge a battery, and in an on-state, cause the AC voltages to be short-circuited to a negative side of the battery;

a zero-crossing detector comprising a comparator that detects a phase of a three-phase AC voltage and configured to detect zero-crossings of the AC voltages;

a switch controller configured to output, based on the zero crossings, a gate signal for turning on and off the plurality of switches; and a detection reference changer configured to change a zero-crossing detection reference for the zero-crossing detector to detect the zero crossings.

2. The battery charger according to claim 1, wherein the zero-crossing detector is configured to compare each of the AC voltages with a reference voltage to detect the zero-crossings, and the detection reference changer comprises:

a reference voltage changer configured to change the reference voltage to change the zero-crossing detection reference.

3. The battery charger according to claim 2, wherein the detection reference changer is configured to change the zero-crossing detection reference according to a load change of a load connected to the battery.

4. The battery charger according to claim 2, wherein the detection reference changer is configured to change the zero-crossing detection reference according to a lower limit value of each of the AC voltages.

5. The battery charger according to claim 1, wherein the detection reference changer comprises a voltage generator configured to generate an offset voltage that is a predetermined negative voltage, and is configured to change the zero-crossing detection reference by supplying the offset voltage via a plurality of resistors respectively to a plurality of detection nodes where the zero-crossing detector detects the zero-crossings.

6. The battery charger according to claim 5, wherein the detection reference changer is configured to change the zero-crossing detection reference according to a load change of a load connected to the battery.

7. The battery charger according to claim 5, wherein the detection reference changer is configured to change the zero-crossing detection reference according to a lower limit value of each of the AC voltages.

8. The battery charger according to claim 1, wherein the detection reference changer is configured to change the zero-crossing detection reference according to a load change of a load connected to the battery.

9. The battery charger according to claim 1, wherein the detection reference changer is configured to change the zero-crossing detection reference according to a lower limit value of each of the AC voltages.

* * * * *